US012594670B1

(12) United States Patent
     Pei et al.

(10) Patent No.: US 12,594,670 B1
(45) Date of Patent: Apr. 7, 2026

(54) GENERATING A SEQUENCE OF POSE CONFIGURATIONS FOR A ROBOTIC MANIPULATOR BASED ON FORCE AND VELOCITY ELLIPSOIDS

(71) Applicant: Amazon Technologies, Inc., Seattle, WA (US)

(72) Inventors: Yinan Pei, Somerville, MA (US); Yuri Anatoly Ivanov, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 18/629,377

(22) Filed: Apr. 8, 2024

(51) Int. Cl.
     *B25J 9/16* (2006.01)

(52) U.S. Cl.
     CPC .................................. *B25J 9/1664* (2013.01)

(58) Field of Classification Search
     CPC ........... B25J 9/1664; B25J 9/163; G06N 5/01; G06N 20/10; G06N 3/006; G06N 7/01; G05B 13/0265
     USPC ................. 701/245–264; 318/568.11–568.25
     See application file for complete search history.

(56) References Cited

U.S. PATENT DOCUMENTS

| | | | | |
|---|---|---|---|---|
| 5,294,873 A * | 3/1994 | Seraji | ..................... | B25J 9/1638 |
| | | | | 318/568.1 |
| 9,875,335 B2 * | 1/2018 | Dariush | .................. | B60N 2/00 |
| 10,216,892 B2 * | 2/2019 | John | ...................... | G06F 30/20 |
| 11,648,664 B2 * | 5/2023 | Rozo | ........................ | G06N 7/01 |
| | | | | 700/246 |
| 12,325,136 B2 * | 6/2025 | Mao | ........................ | B25J 9/1671 |
| 2014/0100828 A1 * | 4/2014 | Dariush | .................. | G06T 19/00 |
| | | | | 703/2 |
| 2015/0094991 A1 * | 4/2015 | John | ........................ | G06F 30/15 |
| | | | | 703/1 |
| 2021/0122037 A1 * | 4/2021 | Rozo | ........................ | B25J 9/163 |
| 2021/0178585 A1 * | 6/2021 | Rozo | ..................... | B25J 9/1664 |

OTHER PUBLICATIONS

Mohammadi et al; "A real-time impedance-based singularity and joint-limits avoidance approach for manual guidance of industrial robots"; 2017; Taylor & Francis and The Robotics Society of Japan; Advanced Robotics, 2017 Vo L. 31, No. 18, 1016-1028 https://doi.org/10.1080/01691864.2017.1352536 (Year: 2017).*

(Continued)

*Primary Examiner* — Jaime Figueroa
(74) *Attorney, Agent, or Firm* — Kilpatrick Townsend & Stockton LLP

(57) ABSTRACT

Techniques for generating pose sequences for a robotic manipulator to perform a task based on velocity ellipsoids and force ellipsoids are described herein. For example, a computer system can generate candidate pose configurations of a robotic manipulator. Each candidate pose configuration can include a first end of the robotic manipulator being positioned along a trajectory. The computer system can determine a velocity ellipsoid and a force ellipsoid for each candidate pose configuration. The computer system can generate a sequence of pose configurations for the robotic manipulator to perform a task along the trajectory by minimizing a cost function subject to one or more constraints based at least in part on (i) the candidate pose configurations, (ii) a first weight for the velocity ellipsoid, and (iii) a second weight for the force ellipsoid.

20 Claims, 10 Drawing Sheets

(56) References Cited

OTHER PUBLICATIONS

Kurazume et al; A New Index of Serial-Link Manipulator Performance Combining Dynamic Manipulability and Manipulating Force Ellipsoids; 2006; IEEE Transactions on Robotics, vol. 22, No. 5, Digital Object Identifier 10.1109/TRO.2006.878949 (Year: 2006).*
Jaime Martinez; Manipulability ellipsoids in robotics; 2013; Blog at WorldPress.com; (Year: 2013).*
Pei. Y. et al., "Planning with Purpose: Task-Specific Trajectory Optimization", IEEE Robotics and Automation Letters Conference, Mar. 22, 2024, 8 pages.

* cited by examiner

CONSTRAINTS 216

WORKSPACE 202

CANDIDATE POSE CONFIGURATIONS 204

TRAJECTORY 108

SEQUENCE OF POSE CONFIGURATIONS 138

COST FUNCTION 134

VELOCITY TERM 210

FORCE TERM 212

FIRST WEIGHT 214A

SECOND WEIGHT 214B

VELOCITY ELLIPSOIDS 124

FORCE ELLIPSOIDS 126

VELOCITY DIRECTION OF INTEREST 206

FORCE DIRECTION OF INTEREST 208

106

700

GENERATE CANDIDATE POSE CONFIGURATIONS OF A ROBOTIC MANIPULATOR, EACH OF THE CANDIDATE POSE CONFIGURATION INCLUDING A FIRST END OF THE ROBOTIC MANIPULATOR BEING POSITIONED ALONG A TRAJECTORY 702

DETERMINE A VELOCITY ELLIPSOID AND A FORCE ELLIPSOID FOR EACH OF THE CANDIDATE POSE CONFIGURATIONS 704

GENERATE A SEQUENCE OF POSE CONFIGURATIONS FOR THE ROBOTIC MANIPULATOR TO PERFORM A TASK ALONG THE TRAJECTORY BY MINIMIZING A COST FUNCTION SUBJECT TO A CONSTRAINT BASED AT LEAST IN PART ON THE CANDIDATE POSE CONFIGURATIONS, A FIRST WEIGHT FOR THE VELOCITY ELLIPSOID, AND A SECOND WEIGHT FOR THE FORCE ELLIPSOID 706

FIG. 7

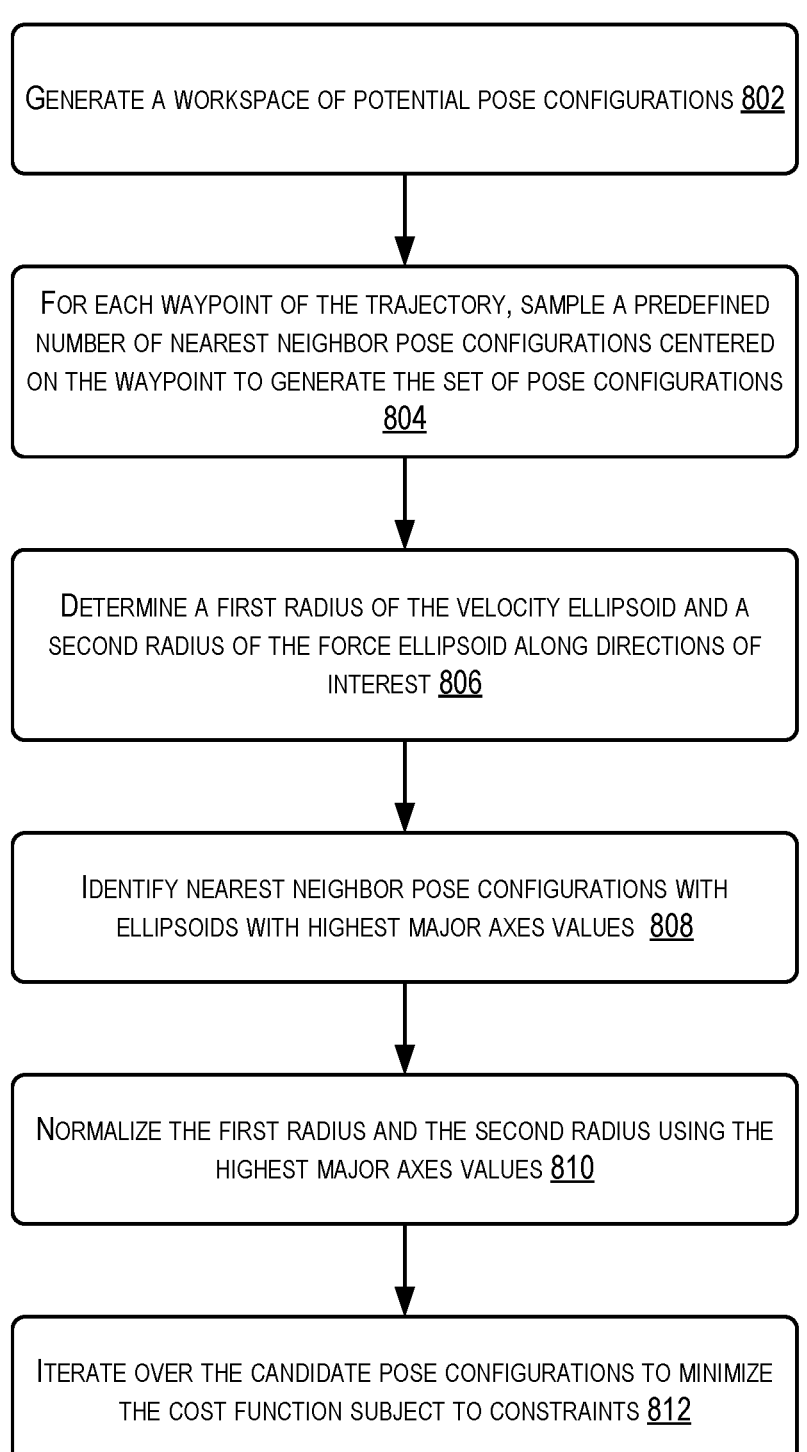

800

GENERATE A WORKSPACE OF POTENTIAL POSE CONFIGURATIONS 802

FOR EACH WAYPOINT OF THE TRAJECTORY, SAMPLE A PREDEFINED NUMBER OF NEAREST NEIGHBOR POSE CONFIGURATIONS CENTERED ON THE WAYPOINT TO GENERATE THE SET OF POSE CONFIGURATIONS 804

DETERMINE A FIRST RADIUS OF THE VELOCITY ELLIPSOID AND A SECOND RADIUS OF THE FORCE ELLIPSOID ALONG DIRECTIONS OF INTEREST 806

IDENTIFY NEAREST NEIGHBOR POSE CONFIGURATIONS WITH ELLIPSOIDS WITH HIGHEST MAJOR AXES VALUES 808

NORMALIZE THE FIRST RADIUS AND THE SECOND RADIUS USING THE HIGHEST MAJOR AXES VALUES 810

ITERATE OVER THE CANDIDATE POSE CONFIGURATIONS TO MINIMIZE THE COST FUNCTION SUBJECT TO CONSTRAINTS 812

FIG. 8

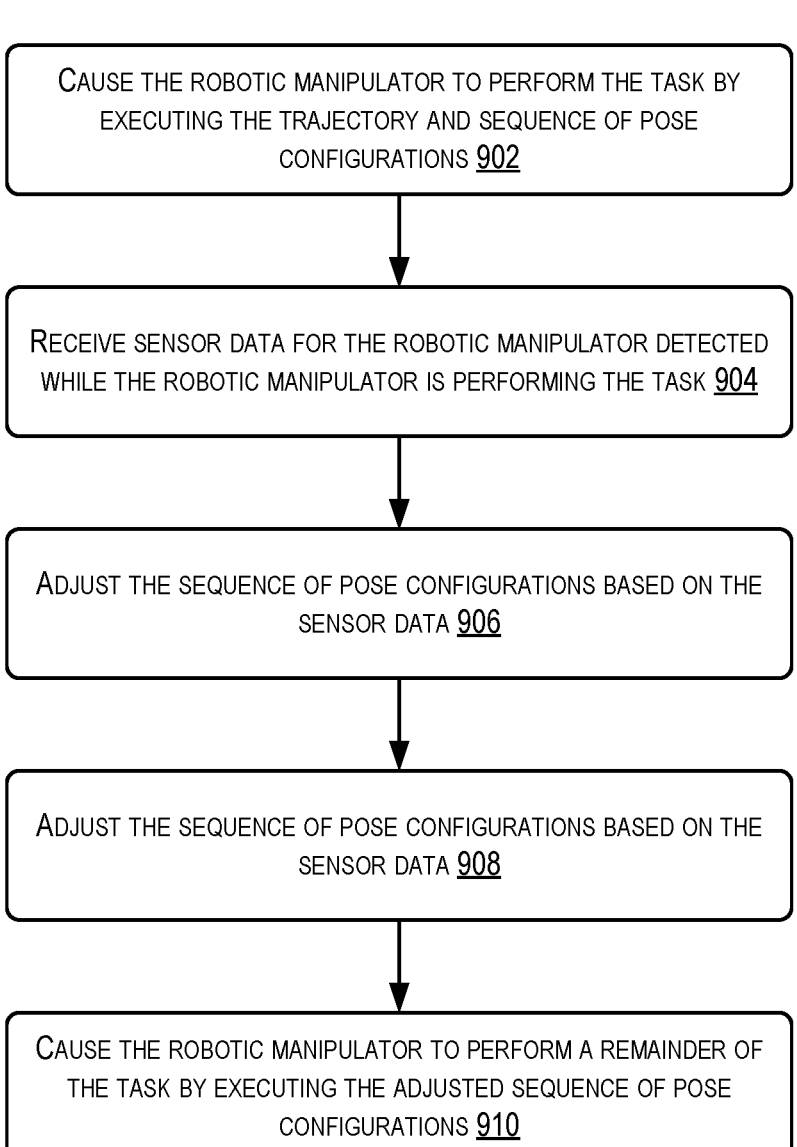

CAUSE THE ROBOTIC MANIPULATOR TO PERFORM THE TASK BY EXECUTING THE TRAJECTORY AND SEQUENCE OF POSE CONFIGURATIONS 902

RECEIVE SENSOR DATA FOR THE ROBOTIC MANIPULATOR DETECTED WHILE THE ROBOTIC MANIPULATOR IS PERFORMING THE TASK 904

ADJUST THE SEQUENCE OF POSE CONFIGURATIONS BASED ON THE SENSOR DATA 906

ADJUST THE SEQUENCE OF POSE CONFIGURATIONS BASED ON THE SENSOR DATA 908

CAUSE THE ROBOTIC MANIPULATOR TO PERFORM A REMAINDER OF THE TASK BY EXECUTING THE ADJUSTED SEQUENCE OF POSE CONFIGURATIONS 910

FIG. 9

GENERATING A SEQUENCE OF POSE CONFIGURATIONS FOR A ROBOTIC MANIPULATOR BASED ON FORCE AND VELOCITY ELLIPSOIDS

BACKGROUND

Many modern-day industries are relying more and more on robotic manipulators. Such robotic manipulators may function to increase repeatability of tasks, increase efficiency of production lines, and bring other benefits to their operators. Conventionally, robotic manipulator manufacturers, especially those that develop robotic arms, may offer fixed sizes of robotic arms, leaving little room for customization. This can result in an operator having to pick an oversized, overpowered, and/or otherwise suboptimal robotic arm to perform certain tasks.

BRIEF DESCRIPTION OF THE DRAWINGS

Various embodiments in accordance with the present disclosure will be described with reference to the drawings, in which:

FIG. 7 illustrates an example flow diagram of a process for generating a sequence of pose configurations for a robotic manipulator based on velocity ellipsoids and force ellipsoids, according to at least one embodiment;

FIG. 8 illustrates an example flow diagram of another process for generating a sequence of pose configurations for a robotic manipulator based on velocity ellipsoids and force ellipsoids, according to at least one embodiment;

FIG. 9 illustrates an example flow diagram of a process for updating a sequence of pose configurations based on sensor data, according to at least one embodiment.

DETAILED DESCRIPTION

Figure 1:
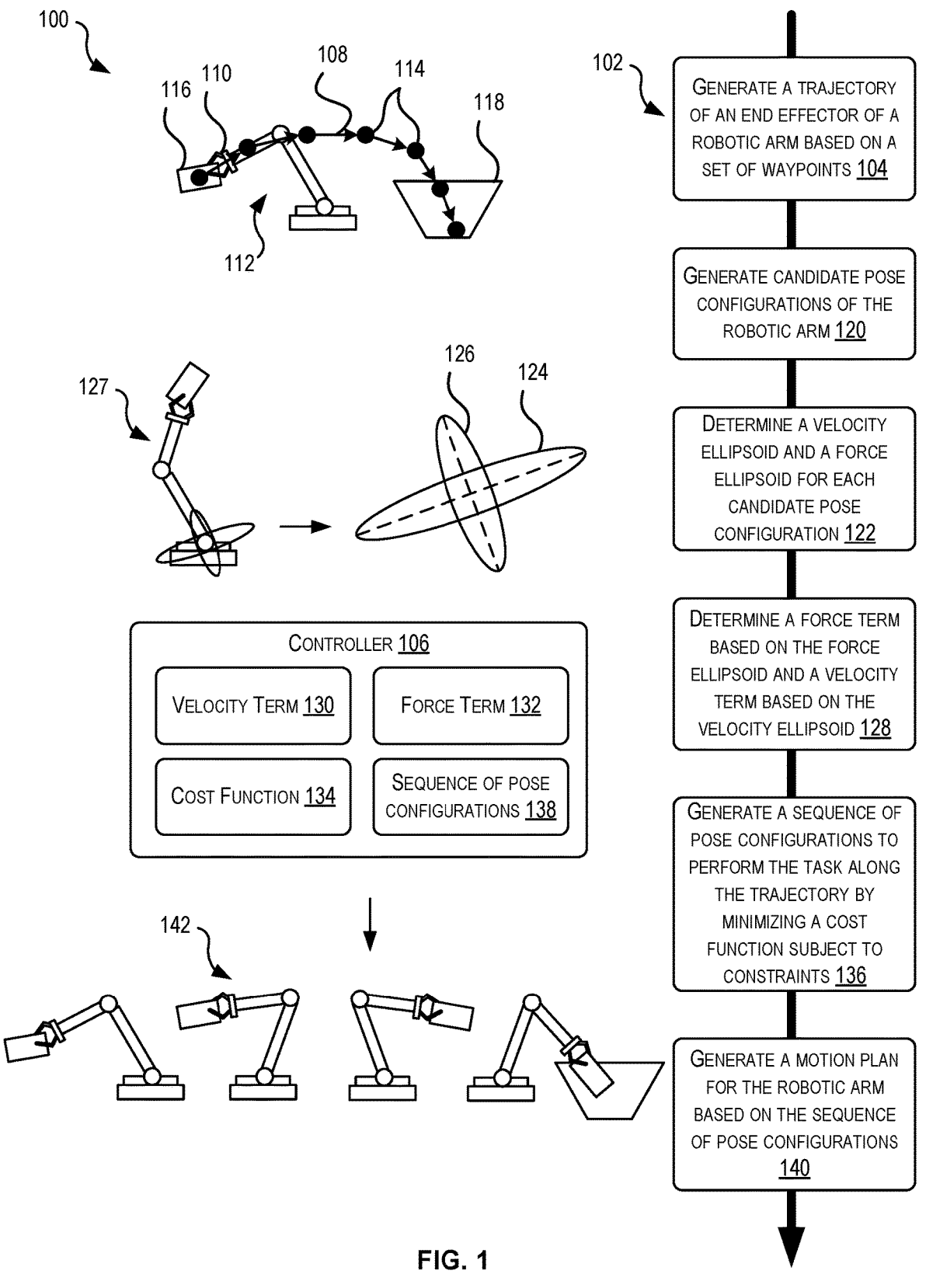
FIG. 1 illustrates an example block diagram and a flowchart showing an example process for generating a sequence of pose configurations executed by a robotic manipulator to perform a task, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, techniques for generating sequences of pose configurations for a robotic manipulator to perform a task by use both velocity and force manipulability ellipsoids. Robotic manipulators may be used in inventory systems to sort or move objects such as boxes or packages. For example, the robotic manipulator can grasp an object from a first bin and then move the object along a trajectory to deposit the object into a second bin. The robotic manipulator may include multiple links and joints that can be positioned in different pose configurations, such as by changing joint angles. Many combinations of pose configurations can be used to perform the same trajectory, but may differ in efficiency (e.g., torque or inertial efficiency). For example, some pose configurations may support relatively higher lifting performance, while others may execute the trajectory at relatively higher velocities. It can be beneficial to take force and velocity of pose configurations into account when generating motion plans for robotic manipulators.

To generate a sequence of pose configurations for the trajectory that considers both force and velocity, depending on requirements of the task, a computer system can determine a velocity ellipsoid and a force ellipsoid for each candidate pose configuration that can be used to move an end effector of the robotic manipulator along the trajectory. The ellipsoids can represent the ability of the robotic manipulator to generate velocity or force at the end effector based on the pose configuration. The computer system can generate the sequence of pose configurations by minimizing, based at least in part on the candidate pose configurations, a first weight for the velocity ellipsoids, and a second weight for the force ellipsoids, a cost function subject to a constraint. The computer system can cause the robotic manipulator to perform the task by executing the trajectory and the sequence of pose configurations.

To illustrate, consider an example of a fulfillment center. Robotic arms with end effectors may perform specialized tasks, such as picking up an object (e.g., a box, a package, or any other type of item) from a conveyer and stowing the object in a container (e.g., a bin, a tote, etc.) associated with an end destination for the object. A robotic arm can move the end effector along a trajectory to perform the task. A controller for the robotic arm can determine a sequence of pose configurations in which the robotic arm can be positioned to move the end effector along the trajectory. Typically, for robotic trajectory planning, it may be assumed that a robotic arm can be strong enough or fast enough to perform any encountered task. In contrast, humans often take on and succeed at physical tasks that far exceed their typical performance. In a similar manner, the controller can generate a sequence of pose configurations for the robotic arm in the extremes of the range of its performance by both minimizing joint torque and maximizing linear velocity based on a particular task.

For example, the controller can generate a workspace of possible pose configurations for the trajectory. The controller can sample a predefined number (e.g., 50) of nearest neighbor pose configurations centered on waypoints of the trajectory. For each of these sampled pose configurations, the controller can determine manipulability ellipsoids (e.g., force and velocity ellipsoids). Moving the robotic manipulator along the direction of the major axis of the force ellipsoid may generate relatively high amounts of force, while moving the robotic manipulator along the direction of the major axis of the velocity ellipsoid may generate relatively high amounts of velocity.

The controller may generate the sequence of pose configurations using a cost function. The cost function can include terms based on the ellipsoids. In some examples, the terms may be normalized by dividing by the highest major axis value in the nearest neighbor pose configurations sampled from the workspace. The terms may also be weighted based on requirements of the task. For example, if the task involves the robotic manipulator lifting an object from a first height to a second height, a first weight for the term associated with the force ellipsoid may be higher than a second weight for the term associated with the velocity ellipsoid. Or, if the task involves quickly moving an object from a first location to a second location, the second weight may be higher than the first weight. The weights may be user selected in some examples, while in other examples, the controller may select the weights based on sensor data or task requirements (e.g., weight of the object being manipulated, detected torque or velocity of joints in the robotic arm, etc.). The controller can minimize the cost function, iterating over the sampled candidate pose configurations, to generate a sequence of pose configuration that blends "fast" pose configurations and "strong" pose configurations according to the weights. The cost function can be minimized subject to constraints including maximum joint range of motion, maximum velocity, and maximum torque value for the robotic arm performing the pose configurations.

Embodiments of the present disclosure provide several technological advantages over conventional techniques for planning robotic manipulator pose configurations. Typically, robot programmers may rarely directly consider the tasks that robots will be executing, and may develop fairly generalized motion paths that focus only on reachability and rated torques and velocities. Such generalized motion paths may be inefficient when applied to various tasks. For instance, typical methods to find corresponding joint pose configurations for a trajectory may involve solving an Inverse Kinematics (IK) problem using iterative methods or Jacobian-based methods (e.g., resolved-rate control or null-space projection). But using IK methods may involve intensive computational costs. Additionally, it may be difficult to incorporate manipulator dynamics, especially for robotic manipulators with relatively high degrees of freedom, into such IK methods. In contrast, embodiments described herein can resolve the pose configurations for desired task trajectories as a forward-planning problem via sampling-based methods (e.g., nonlinear optimization). Compared to conventional techniques, embodiments described herein can produce a sequence of pose configurations for a task trajectory with reduced computational resource consumption and improved task performance. For example, depending on the task, a sequence of pose configurations that minimizes joint torque (e.g., for a lifting task), maximizes joint velocity (e.g., for a ballistic task), or somewhere in between can be generated based on manipulability ellipsoids. These task-specific pose configurations can allow robotic manipulators to perform tasks more efficiently (e.g., faster or with reduced torque based on dynamic task requirements) compared to the generalized motion paths generated using conventional techniques.

Using the techniques described herein may enable extension of typical limits of performance for a robotic manipulator. For example, a sequence of pose configurations can be generated for a robotic manipulator to lift an extensively heavy load or move the load at a relatively high velocity that may not be achievable by any individual actuator in the kinematic chain of the robotic manipulator. Extending the limits of performance may involve not only the robotic manipulator's joint torque and velocity capacity, but also using the physical structure of the robotic manipulator to provide lift and support. Further, individual joint movements can be synchronized in such a way that the velocity of the end effector exceeds the velocity of each individual actuator in the robotic manipulator.

In the interest of clarity of explanation, embodiments may be described herein in connection with an inventory system, inventory items (e.g., items associated with an inventory), and manipulations related to an inventory item. However, the embodiments are not limited as such. Instead, the embodiments may similarly apply to any objects, whether inventoried or not, and to any system, whether related to inventorying objects or not. For example, the embodiments may similarly apply to a manufacturing system, supply chain distribution center, airport luggage system, or other systems using robot stations to perform various automated, and, in some instances, autonomous operations.

FIG. 1 illustrates an example block diagram 100 and a flowchart showing an example process 102 for generating a sequence of pose configurations executed by a robotic manipulator to perform a task, according to at least one embodiment. The diagram 100 depicts devices, objects, and the like that correspond to the process 102. The process 102 can be performed by any suitable combination of hardware and/or software as implemented by a computer system, such as controller 106, the computer system 1002 of FIG. 10, or any other suitable device. The controller 106 and the computer system 1002 may be any suitable combination of computing devices such as one or more server computers, which may include virtual resources, services, and the like capable of performing the functions described with respect to the controller 106 or the computer system 1002. In some examples, components of the controller 106 or the computer system 1002 may be distributed between a server (e.g., a cloud-based virtual instance) and a local computer.

FIGS. 1, 7, 8, and 9 illustrate example flow diagrams showing processes 102, 700, 800, and 900 according to at least a few examples. Some or all of the processes 102, 700, 800, and 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 may begin at block 104 with the controller 106 generating a trajectory 108 of an end effector 110 of a robotic arm 112 based on a set of waypoints 114. The robotic arm 112 can use the trajectory 108 to perform a task, such as grasping an object 116 with the end effector 110 and moving the object 116 from an initial location (e.g., on a conveyer for an inventory system) to a destination location (e.g., into a container 118 associated with an end destination for the object 116). The end effector 110 can follow the trajectory 108 to move the object 116 to the container 118. The waypoints 114 may indicate locations that the end effector 110 should be positioned in while performing the task. Thus, the trajectory 108 can connect each of the waypoints 114.

At block 120, the controller 106 can generate candidate pose configurations of the robotic arm 112. A pose configuration for the robotic arm 112 can include the joint positions and joint angles of the robotic arm 112. There can be many pose configurations and combinations of pose configurations that can result in the end effector 110 following the trajectory 108, with some pose configurations being more beneficial for the task than others. For each waypoint 114, the controller 106 can use forward kinematics to generate and identify candidate pose configurations that result in the end effector 110 being positioned at or near the waypoint 114. For example, the controller 106 may sample the fifty (or any other predefined number) nearest neighbor pose configurations for each waypoint 114 to generate the candidate pose configurations. Additionally or alternatively, the controller 106 can generate the candidate pose configurations by generating a continuum of pose configurations that result in the end effector 110 being positioned at or near the waypoints 114. For example, the controller 106 can fit a function to the sampled nearest neighbor pose configurations. The candidate pose configurations can include pose configurations generated by the function, which can include intermediate pose configurations between waypoints.

At block 122, the controller 106 can determine a velocity ellipsoid 124 and a force ellipsoid 126 for each of the candidate pose configurations 127. The velocity ellipsoid 124 can represent a mapping from a unit norm joint velocity to the linear or angular joint velocity of the end effector 110 through the Jacobian of the robotic arm 112 at a given set of joint angles. The force ellipsoid 126 is a reciprocal of the velocity ellipsoid 124 and can represent a mapping between the unit norm joint torque to the force or torque at the end effector 110. The velocity ellipsoids 124 and the force ellipsoids 126, along with the task that is to be performed along the trajectory 108, can be used to determine how the robotic arm 112 should be posed to perform the task. For example, tasks that require relatively higher force or relatively fine velocity control should involve the robotic arm 112 being positioned along the major axis of the force ellipsoid 126. Similarly, tasks that require relatively higher velocity or relatively fine force control should involve the robotic arm 112 being positioned along the major axis of the velocity ellipsoid 124.

At block 128, the controller 106 can determine a velocity term 130 based on the velocity ellipsoid 124 and a force term 132 based on the force ellipsoid 126. The force term 132 and the velocity term 130 can be part of a cost function 134 used to generate an optimal sequence of pose configurations from the candidate pose configurations. The controller 106 can also determine a first weight for the velocity term 130 and a second weight for the force term 132 based on the requirements of the task. The weights may weight how heavily the cost function 134 is biased towards generating a "strong" (e.g., prioritizing high force generation with movement along the major axis of the force ellipsoid 126) sequence of pose configurations or a "fast" (e.g., prioritizing high velocity generation with movement along the major axis of the velocity ellipsoid 124) sequence of pose configurations.

At block 136, the controller 106 can generate a sequence of pose configurations 138 for the robotic arm 112 to perform the task along the trajectory 108 by minimizing the cost function 134 subject to one or more constraints. The constraints can include maximum rotation of joints, maximum joint torque, maximum joint velocity, or any other suitable constraints. The controller 106 can minimize the cost function 134 by iterating over the candidate pose configurations and based on the velocity term 130 (weighted with the first weight) and the force term 132 (weighted with the second weight). If the first weight is higher than the second weight, the cost function 134 can be minimized to generate a sequence of pose configurations 138 that prioritizes velocity generation over force generation. If the second weight is higher than the first weight, the cost function 134 can be minimized to generate a sequence of pose configurations 138 that prioritizes force generation over velocity generation.

At block 140, the controller 106 can generate a motion plan 142 for the robotic arm 112 to execute the task based at least in part on the sequence of pose configurations 138. For example, the motion plan 142 can involve causing the robotic arm 112 to move between each pose configuration in the sequence of pose configurations 138 to move the object 116 along the trajectory 108 from the initial position and into the container 118. The controller 106 may cause the robotic arm 112 to execute the motion plan 142.

Figure 2:
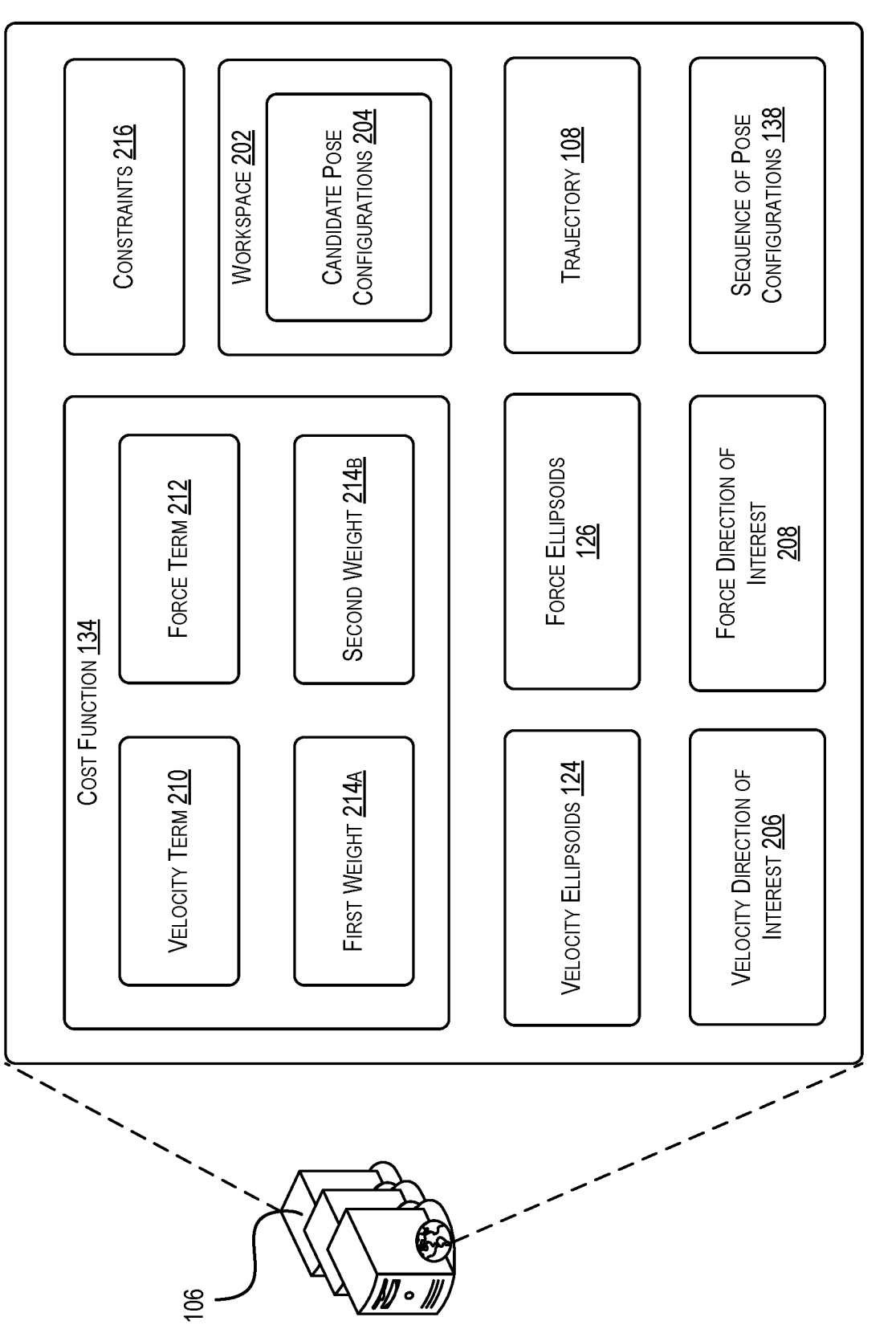
FIG. 2 illustrates an example controller for generating a sequence of pose configurations for a robotic manipulator, according to at least one embodiment.

FIG. 2 illustrates an example controller 106 for generating a sequence of pose configurations 138 for a robotic manipulator, according to at least one embodiment. The controller 106 can generate the sequence of pose configurations 138 for a specific task (e.g., manipulating a position of an object). The task can be characterized by its desired velocity direction and force application direction (e.g., resisting or exerting force). Some basic tasks may dominantly prioritize force application (e.g., lifting a heavy payload) with a looser execution time requirement, while others may prioritize velocity generation (e.g., quickly swinging a payload) while sustaining little load. The controller 106 can use velocity ellipsoids 124 and force ellipsoids 126 to generate the sequence of pose configurations 138.

For example, the controller 106 can generate a trajectory 108 using a set of waypoints 114 or, in some examples, can discretize a trajectory 108 into the set of waypoints 114. The controller 106 can generate a workspace 202 that includes possible pose configurations for a robotic manipulator at or near the trajectory 108. Because there are many pose configurations can result in the end effector of the robotic manipulator being positioned along the trajectory 108, the controller 106 can sample the workspace 202 to generate candidate pose configurations 204 by iterating through joint angles and using forward kinematics. For example, given a discrete predefined trajectory 108 in the workspace 202, the controller 106 can identify a predefined number (e.g., fifty) of nearest neighbor pose configurations at each waypoint of the trajectory 108. The nearest neighbors can be identified based on Euclidean distance from the waypoint and can be candidate pose configurations 204 used by the controller 106. Among the candidate pose configurations 204, the best choice of pose configuration can maximize radius of a velocity ellipsoid 124 along a velocity direction of interest 206, or a force ellipsoid 126 along a force direction of interest 208.

Figure 3:
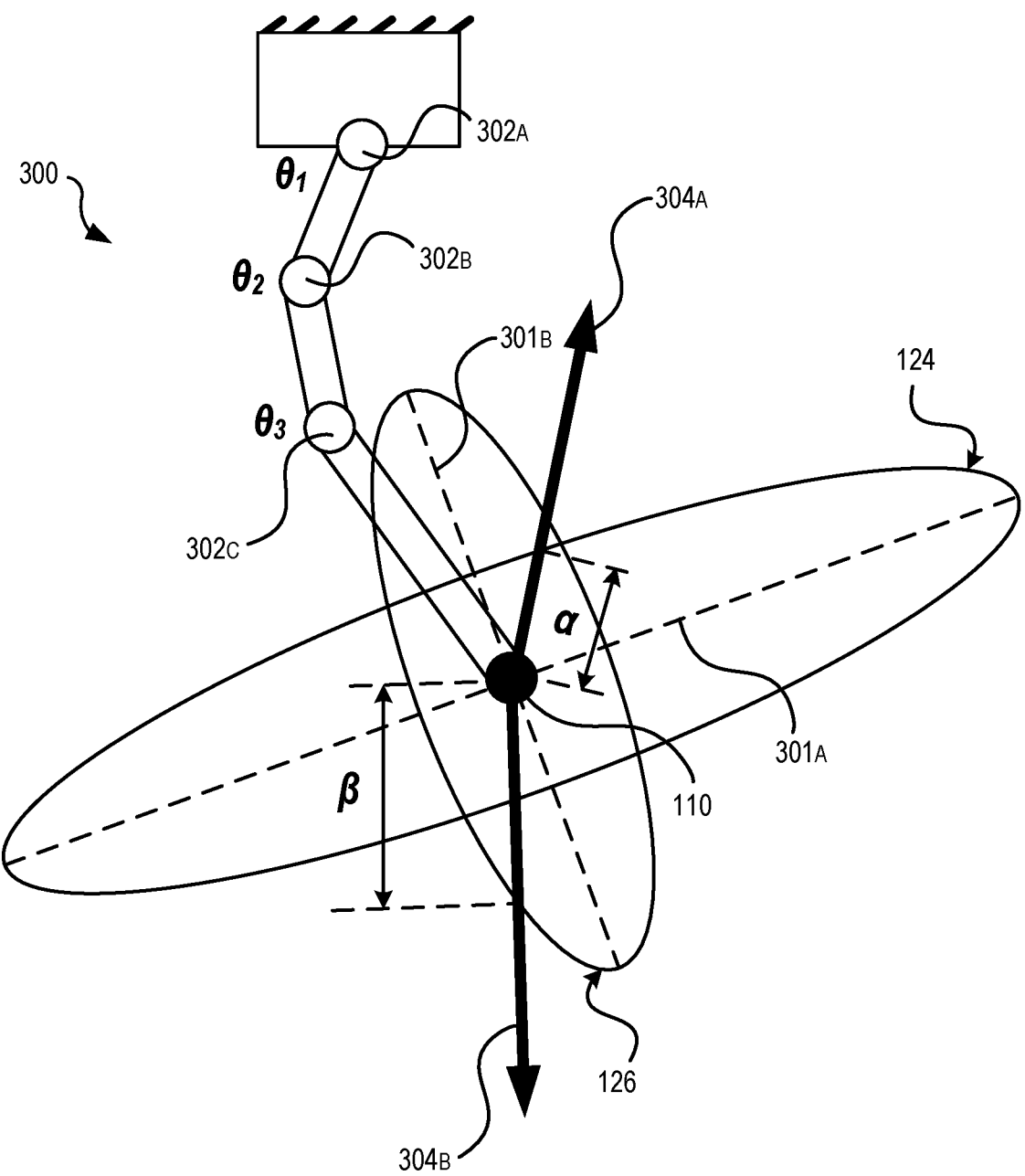
FIG. 3 illustrates an example force ellipsoid and velocity ellipsoid for a pose configuration of a robotic manipulator, according to at least one embodiment.

For example, FIG. 3 illustrates an example velocity ellipsoid 124 and force ellipsoid 126 for a pose configuration of a robotic manipulator 300, according to at least one embodiment. The robotic manipulator 300 can include three joints 302a-c and an end effector 110 connected by links. The pose configuration of the robotic manipulator 300 can be defined by the position and joint angles $\theta_1$, $\theta_2$, and $\theta_3$ for the first joint 302a, second joint 302b, and third joint 302c, respectively. The controller 106 may determine a velocity ellipsoid 124 and a force ellipsoid 126 for each pose configuration. It may be beneficial for tasks that involve relatively high velocity to occur along a first major axis 301a direction of the velocity ellipsoid 124. Similarly, it may be beneficial for tasks that involve relatively high force to occur along a second major axis 301b direction of the force ellipsoid 126.

To allow manipulation redundancy (e.g., having more degrees of freedom than is needed to execute a given task), robotic manipulators often have seven degrees of freedom, while the pose of a rigid object in three-dimensional Cartesian space is uniquely defined by only six variables (e.g., three positions and three orientations). Although embodiments may be described herein in relation to a two-dimensional workspace with a three-link robotic manipulator (e.g., robotic manipulator 300), techniques described herein may apply similarly and equivalently to any redundant robotic manipulator with any number of joints or degrees of freedom.

In some examples, the pose configuration of the robotic manipulator 300 may approach a kinematic singularity, in which the Jacobian matrix of the robotic manipulator 300 loses rank and results in loss of ability to translate or rotate in one or more directions. Typically, driving a robotic manipulator 300 into a singular configuration has been considered unfavorable and to be avoided in order to maximize manipulability. However, kinematic singularities may be useful in performing certain tasks. For example, in kinematic singularity, the radius of the velocity ellipsoid 124 may reduce to zero in the direction in which the robotic manipulator 300 can no longer move. Meanwhile, the radius of the force ellipsoid 126 may stretch to infinity, indicating that when the robotic manipulator 300 is in such a pose configuration, no joint torque may be required for sustaining force or torque along that direction, as all of the force may be withheld entirely by the mechanical structure of the robotic manipulator 300. This may be beneficial for tasks that prioritize lifting payloads.

The controller 106 can define manipulator kinematics for the robotic manipulator 300 in the following Equation 1, where $p \in \mathbb{R}^2$ is the position of the end effector 110, q is the state (joint configuration) vector (where $q=[\theta_1, \theta_2, \theta_3]^T$), and $\theta_1$ are joint angles:

$$p(q)=[l_1 \sin(q_1)+l_2 \sin(q_1+q_2)+l_3 \sin(q_1+q_2+q_3)-l_1 \cos (q_1)-l_2 \cos(q_1+q_2)-l_3 \cos(q_1+q_2+q_3)] \quad (1)$$

The velocity direction of interest 206 for the task can be defined as a first vector 304a. The first vector 304a may point from the current waypoint of the trajectory to the next waypoint of the trajectory. The force direction of interest 208 for the task can be defined as a second vector 304b, which may be a constant vertical vector (e.g., gravity). In some examples, the second vector 304b may be a sum of the vectors of gravity and external forces, such as external forces caused by a payload. External forces may be unknown during pre-planning but may be modeled based on experience or based on sensor data detected in real time. The velocity direction of interest 206 may vary over the trajectory, unlike the force direction of interest 208. The velocity direction of interest 206 and the force direction of interest 208 can be denoted as v (e.g., the unit vector in the target direction). α can denote a radius of the velocity ellipsoid 124 along the velocity direction of interest 206. The radius of the velocity ellipsoid 124 can be a distance from a center of the velocity ellipsoid 124 to a surface of the velocity ellipsoid 124 in the direction of the first vector 304a. β can denote a radius of the force ellipsoid 126 along the force direction of interest 208. The radius of the force ellipsoid 126 can be a distance from a center of the force ellipsoid 126 in the direction of the second vector 304b. v, α, and β can satisfy Equation 2 for the velocity ellipsoid 124 and Equation 3 for the force ellipsoid 126:

$$(\alpha v)^T (JJ^T)^{-1} (\alpha v)=1 \quad (2)$$

$$(\beta v)^T (JJ^T)(\beta v)=1 \quad (3)$$

Therefore, $\alpha=[v^T(JJ^T)^{-1}v]^{-1/2}$ and $\beta=[v^T(JJ^T)v]^{-1/2}$ can produce the radius along the direction of interest (v) for the velocity ellipsoid 124 or the force ellipsoid 126, respectively.

Returning now to FIG. 2, the controller 106 can use α as part of a velocity term 210 and β as part of a force term 212 for a cost function 134. The velocity term 210 can have a first weight 214a and the force term 212 can have a second weight 214b in the cost function 134. The weights 214a-b can bias the cost function 134 towards generating a "stronger" or a "faster" sequence of pose configuration 138. If the first weight 214a is zero, the controller 106 can generate a sequence of pose configurations 138 that maximizes force generation. If the second weight 214b is zero, the controller 106 can generate a sequence of pose configurations 138 that maximizes velocity generation. When the weights 214a-b have a nonzero value, the controller 106 can generate a sequence of pose configurations 138 that blends force and velocity considerations (e.g., according to the values of the weights 214a-b). The weights 214a-b may be predefined (e.g., by a user) or may be determined by the controller 106 based on sensor data, such as torque data, position data, or velocity data detected at the robotic manipulator. The controller 106 can generate the sequence of pose configurations 400 by iterating through the trajectory 108 while minimizing the cost function 134 subject to constraints 216. The constraints 216 can include maximum joint ranges of motion, maximum joint velocities, or maximum joint torques for the robotic manipulator.

Figure 4:
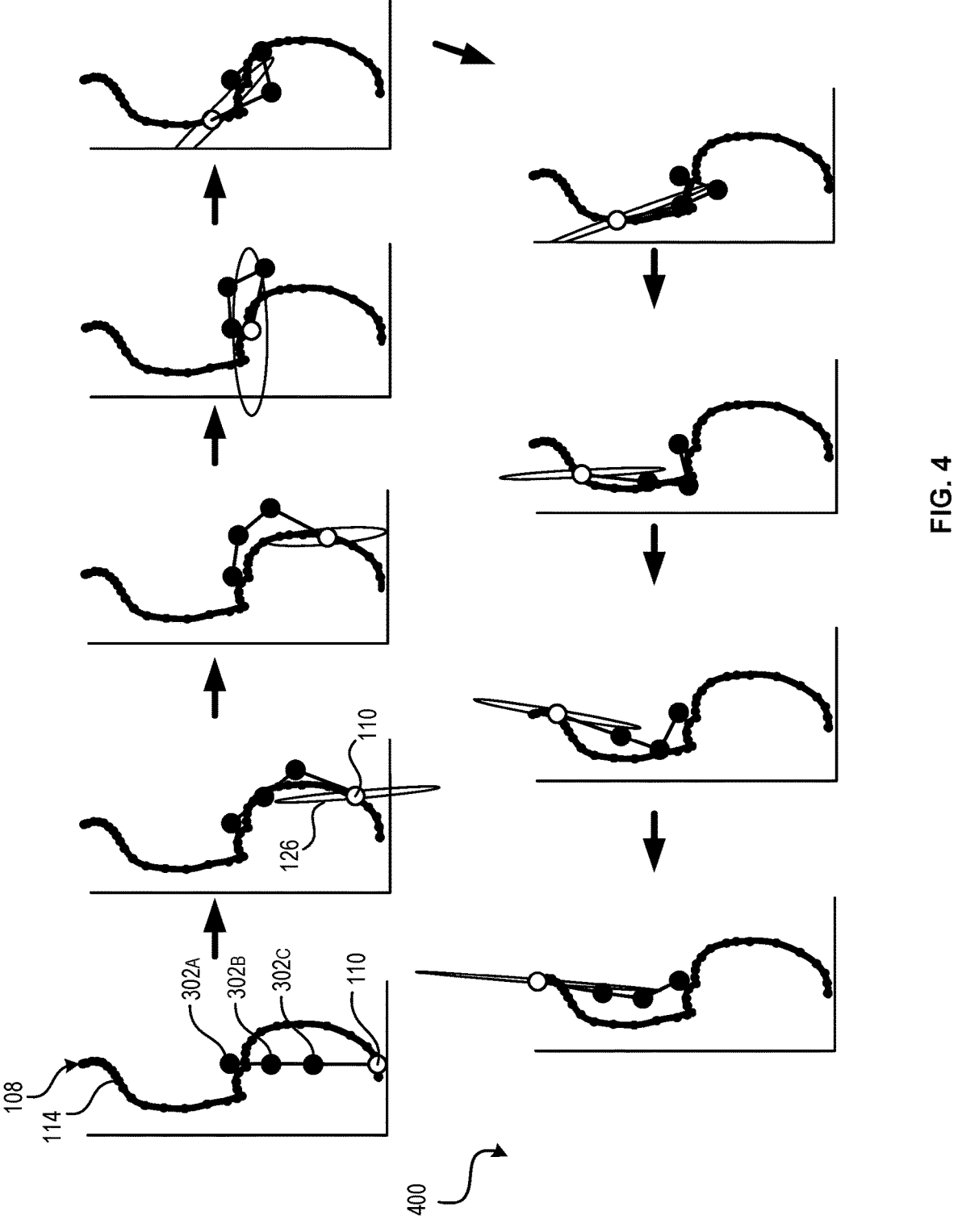
FIG. 4 illustrates an example sequence of pose configurations based on force ellipsoids for a robotic manipulator, according to at least one embodiment.

FIG. 4 illustrates an example sequence of pose configurations 400 based on force ellipsoids for a robotic manipulator, according to at least one embodiment. That is, the controller 106 may generate the sequence of pose configurations 400 based solely on force ellipsoids and not on velocity ellipsoids, such as by setting the first weight 214a for the velocity term 210 to zero. The sequence of pose configurations 400 can therefore be considered a "strong" sequence of pose configurations that can be good at resisting a vertical payload. The controller 106 can minimize the cost function 134 by iterating through the trajectory 108 and selecting, at each waypoint 114, the pose configuration with a force ellipsoid 126 that has the largest β along the force direction of interest 208.

The resulting sequence of pose configurations 400 can include the end effector 110 moving along the trajectory 108 while positioning the joints 302a-c in a manner that is similar to a human lifting a weight (e.g., an upward pushing motion). The sequence of pose configurations 400 can require less joint torque to sustain a payload compared to sequences of pose configurations that prioritize velocity (e.g., the sequence of pose configurations 500 described below in relation to FIG. 5).

The controller 106 can derive the dynamics of the robotic manipulator 300 via the Lagrangian method, and can be described by Equation 4:

$$M(q)\ddot{q}+C(q,\dot{q})\dot{q}+g(q)=u \quad (4)$$

where M(q) is the mass matrix, C(q, $\dot{q}$) is the Corolis matrix, g(q) is the gravitational vector, u is the joint torque vector, and $\dot{q}$ is the joint velocity vector.

The controller 106 can generate the sequence of pose configurations by considering system dynamics and formulating a nonlinear pose optimization problem represented by Equation 6, where x denotes the state vector $x=[q, \dot{q}]^T$:

$$\min_{x,u,t_0,t_f} R_t(t_F - t_0) + \int_{t_0}^{t_F}\left(u^\top R_u u + \frac{R_p(x,u)}{G(x)}\right)dt \qquad (5)$$

$$\text{s.t.} = \dot{x} = f(x,u)$$

$$p(x_0) = p_{initial}$$

$$p(x_F) = p_{target}$$

$$[-\pi, 0, 0]^\top \leq q \leq [\pi, \pi, \pi]^\top$$

$$\dot{q}_{min} \leq \dot{q} \leq \dot{q}_{max}$$

$$u_{min} \leq u \leq u_{max}$$

Figure 5:
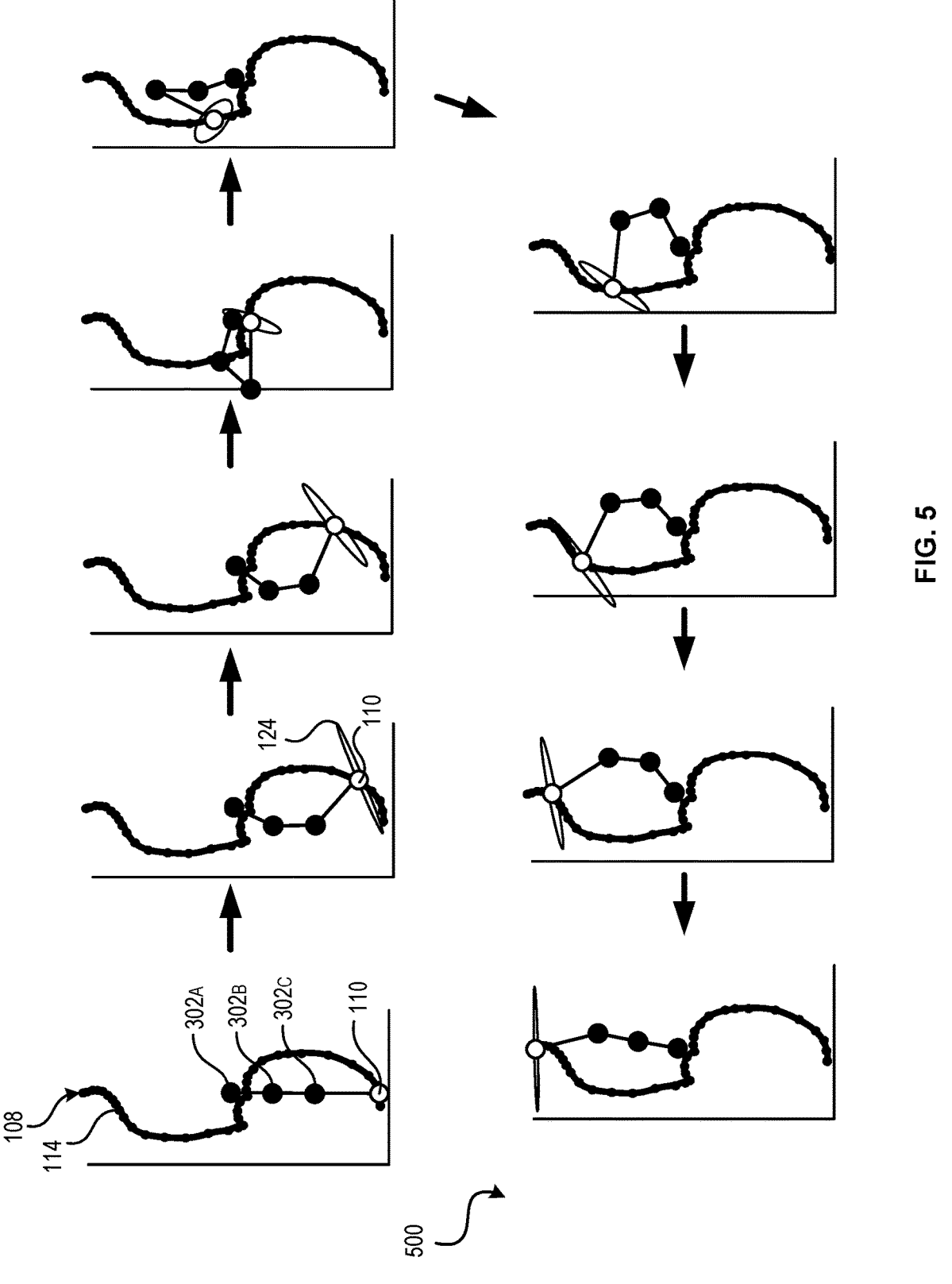
FIG. 5 illustrates an example sequence of pose configurations based on velocity ellipsoids for a robotic manipulator, according to at least one embodiment.

The decision variables are state vector, control efforts, and initial and final time of the trajectory 108. f(x, u) is the nonlinear dynamics constraint based on Equation 4. G(x) is the pose-aware cost weighted by $R_p \in \mathbb{R}$ and is defined by $\alpha(x)$ or $\beta(x)$, depending on whether the goal is to generate "fast," "strong," or "blended" pose configurations. There are also terms in the cost function to regularize trajectory duration weighted by $R_t \in \mathbb{R}$ and actuator torques weighted by $R_u \in \mathbb{R}^{3 \times 3}$. The weight of the selected pose configuration $R_p$ can be a function of the current state and control efforts, and may be different at each waypoint 114 along the trajectory 108 for each iteration of the cost function. For tasks requiring "strong" pose configurations (e.g., as depicted in FIG. 4), $R_p = R_{pf} u^T u$. That is, if the torque planned by the optimizer is relatively large at a waypoint 114 of the trajectory 108, more weight will be placed on selecting a strong pose configuration. For tasks requiring "fast" pose configurations (e.g., as depicted in FIG. 5), $R_p = R_{pv} \dot{q}^T \dot{q}$. That is, more weight can placed on a fast pose configuration when planned instantaneous joint velocity is high. $R_{pf}$ and $R_{pv}$ are constant weights $\in \mathbb{R}$.

To generate the sequence of pose configurations 400 depicted in FIG. 4, the controller 106 can configure the cost function to prioritize "strong" pose configurations against a heavy payload using as little joint torque as possible to reach a target location (similar to a weightlifting motion) according to Equation 6:

$$\min_{x,u,t_0,t_F} R_t(t_F - t_0) + \int_{t_0}^{t_F}\left(u^\top R_u u + \frac{R_{pf} u^\top u}{\beta(x)}\right)dt \qquad (6)$$

$$\text{s.t.} = \dot{x} = f(x,u)$$

$$p(x_0) = p_{initial}$$

$$p(x_F) = p_{target}$$

$$\dot{q}(t_0) - \dot{q}(t_F) = [0, 0, 0]^\top$$

where all other constraints on joint range of motion, torque, and velocity still hold.

Since the force direction of interest 208 is set to be a downward vector (due to gravity), the resulting sequence of pose configurations 400 can prioritize pose configurations that are good at resisting vertical force. For example, the sequence of pose configurations 400 can go through two intermediate singularities (e.g., where the third link points upward and then the second link points upward), while performing brief rapid motions to move between singularities until eventually reaching the target. This sequence of pose configurations 400 can be similar to the weightlifting "clean and jerk" technique.

In other examples, the controller may generate a sequence of pose configurations based solely on velocity ellipsoids and not on force ellipsoids, such as by setting the second weight 214b for the force term 212 to zero. Such a sequence of pose configurations 500 is depicted in FIG. 5. The sequence of pose configurations 500 can therefore be considered a "fast" sequence of pose configurations that can be good at generating linear velocity of the end effector 110. The controller 106 can minimize the cost function 134 by iterating through the trajectory 108 and selecting, at each waypoint 114, the pose configuration with a velocity ellipsoid 124 that has the largest $\alpha$ along the velocity direction of interest 206. The resulting sequence of pose configurations 500 can include the end effector 110 moving along the trajectory 108 while positioning the joints 302a-c in a manner that is similar to an arm swing pattern (e.g., for throwing a ball). The sequence of pose configurations 500 can generate more joint velocity compared to sequences of pose configurations that prioritize force (e.g., the sequence of pose configurations 400 described above in relation to FIG. 4).

For example, Equation 6 can be used to generate the sequence of pose configurations 500 in which the end effector 110 can reach a maximum linear velocity at the end of the trajectory 108 (e.g., subject to joint velocity constraints):

$$\min_{x,u,t_0,t_F} R_t(t_F - t_0) + \frac{R_v}{\dot{p}(x_F)^\top \dot{p}(x_F)} + \int_{t_0}^{t_F}\left(u^\top R_u u + \frac{R_{pv} \dot{q}^\top \dot{q}}{\alpha(x)}\right)dt \qquad (6)$$

$$\text{s.t.} = \dot{x} = f(x,u)$$

$$p(x_0) = p_{initial}$$

$$\dot{p}_x(x_F) = \dot{p}_y(x_F) > 0$$

where all other constraints on joint range of motion, torque, and velocity still hold.

The resulting sequence of pose configurations 500 can generate maximum linear velocity for the end effector 110, given the joint velocity constraints and a relatively light payload. The sequence of pose configurations 500 can go through a series of "winding up" the robotic manipulator and then rapidly actuating the joints to extend the robotic manipulator and increase a linear velocity of the end effector 110. This sequence of pose configurations 500 may be similar to a badminton forehand "high clear" shot motion if considering the first two links of the robotic manipulator as upper arm and forearm and the third link as the racket.

Figure 6:
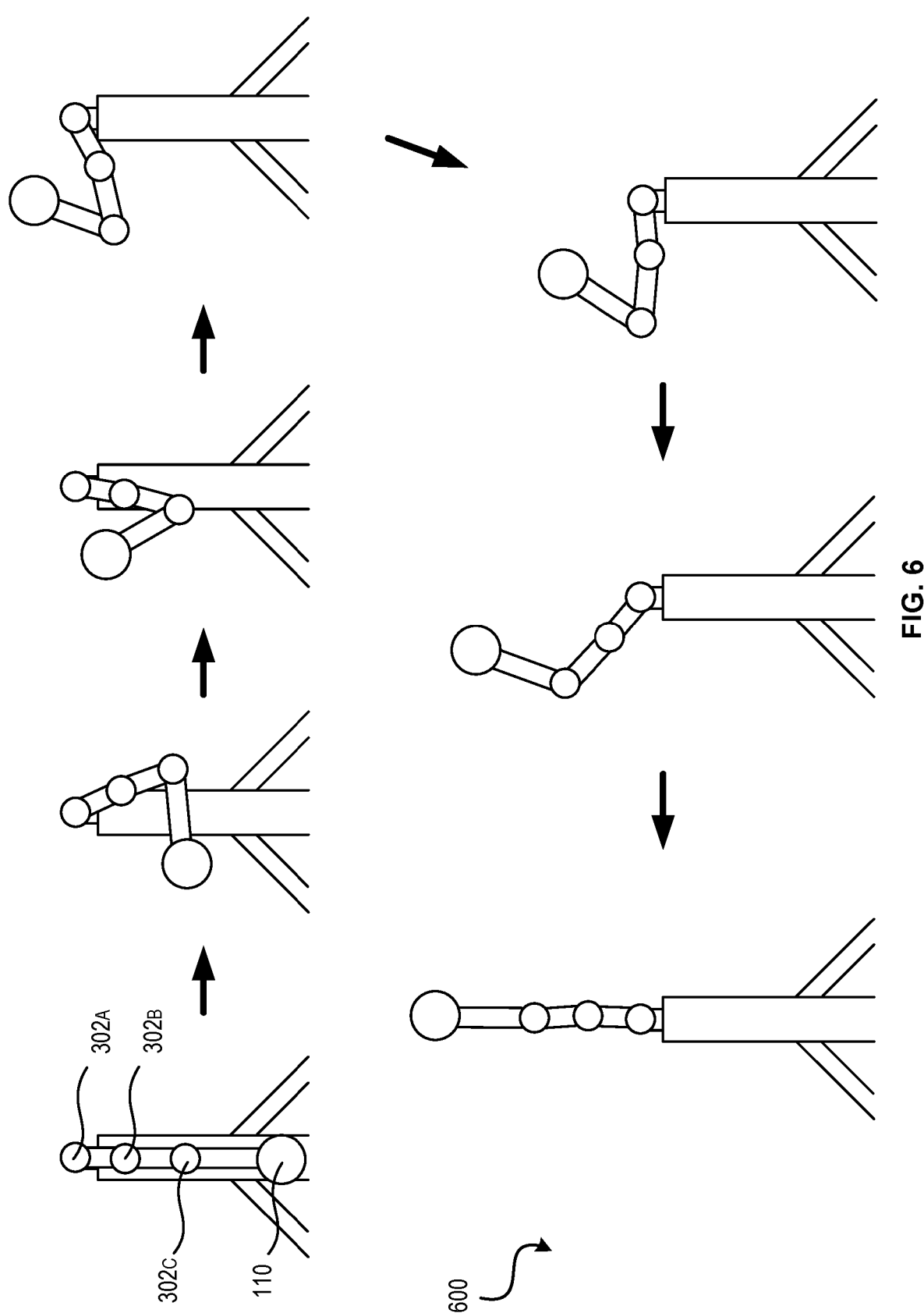
FIG. 6 illustrates an example sequence of pose configurations based on velocity ellipsoids and force ellipsoids for a robotic manipulator, according to at least one embodiment.

The controller 106 may also generate a sequence of pose configuration that blends the "strong" and "fast" considerations. Such an example is depicted in FIG. 6, which illustrates an example sequence of pose configurations 600 based on both velocity ellipsoids and force ellipsoids for a robotic manipulator, according to at least one embodiment. It may be beneficial to combine both "strong" and "fast" pose configurations for more complex tasks.

A natural way to blend pose costs can be to put $$\frac{R_{pv} \dot{q}^\top \dot{q}}{\alpha(x)} \text{ and } \frac{R_{pf} u^\top u}{\beta(x)}$$

in the same cost function. In this case, $R_{pv}$ and $R_{pf}$ (e.g., the weights) can determine the relative importance between "strong" and "fast" pose configurations. However, $\alpha$ and $\beta$ can have significantly different magnitudes, since velocity ellipsoids and force ellipsoids are reciprocal to one another. The relative ellipsoid radius can be obtained by re-using the sampled pose configurations pose configurations 204 from the workspace 202, finding the k nearest neighbors of each waypoint 114 along the trajectory 108 (e.g., k=50), and dividing $\alpha$ and $\beta$ by the maximum ellipsoid radius found among the k nearest neighbor pose configurations. This can be done at each waypoint 114 along the trajectory 108. The resulting cost function represented in Equation 8 can have $\overline{\alpha}$ representing relative velocity ellipsoid radius, $\overline{\beta}$ representing relative force ellipsoid radius, and $\overline{q}$ and $\overline{u}$ can also be divided by the maximum joint torque and joint velocity limits. All of these quantities can be between 0 and 1, so, correspondingly, $R_{pv}$ and $R_{pf}$ can have relatively larger values.

$$\min_{x,u,t_0,t_F} R_t(t_F - t_0) + \int_{t_0}^{t_F}\left( u^\top R_u u + \frac{R_{pv}\dot{q}^\top\dot{q}}{\overline{\alpha}(x)} + \frac{R_{pf}\overline{u}^\top\overline{u}}{\overline{\beta}(x)} \right)dt \qquad (8)$$

$$\text{s.t.} = \dot{x} = f(x, u)$$

$$p(x_0) = p_{initial}$$

$$p(x_F) = p_{target}$$

$$q(t_0) = q(t_F) - [0, 0, 0]^\top$$

If the weights (e.g., $R_{pv}$ and $R_{pf}$) are equal, the sequence of pose configurations 500 can be equally biased towards "strong" pose configurations and "fast" pose configurations. Other tasks may prioritize other weight distributions that may be more strongly weighted towards one type of pose configuration.

For equally balanced weights, the resulting sequence of pose configurations 500 depicted in FIG. 5 can involve quickly swinging up the third link of the robotic manipulator to move the payload near the base of the robotic manipulator in a first stage, then pushing the payload up to the target location in a second stage. This motion may be similar to a combination of the sequence of pose configurations 400 of FIG. 4 and the sequence of pose configurations 500 of FIG. 5. For example, the sequence of pose configurations 500 can initiate with "fast" pose motion, followed by "strong" pose motion, and ending with mixed pose motion (biased to "fast"). That is, the weights for the force term and the velocity term in the cost function can, in some examples, vary over the trajectory. Compared to the sequence of pose configurations 400 in which only the force ellipsoid was considered, the sequence of pose configurations 500 may differ in how the payload is handled after the payload is pulled close to the base.

In some examples, the sequences of pose configurations described herein can be generated offline. That is, a sequence of pose configurations can be pre-planned. In other examples, the sequence of pose configurations can be generated and adjusted in real time using sensor data. For example, the controller 106 may adjust the velocity direction of interest 206 (and corresponding first vector 304a) or the force direction of interest 208 (and corresponding second vector 304b) to include torque data or velocity data detected for the robotic manipulator. Or, the controller 106 may adjust the weights 214a-b for the velocity term 210 or the force term 212 based on the torque data or velocity data. For example, a payload having a weight above a predefined threshold may result in an increased second weight 214b for the force term 212 to prioritize "strong" pose configurations.

FIG. 7 illustrates an example flow diagram of a process 700 for generating a sequence of pose configurations for a robotic manipulator based on velocity ellipsoids and force ellipsoids, according to at least one embodiment. In some examples, the controller 106 of FIG. 1 or the computer system 1002 of FIG. 10 may perform some or all parts of the process 700.

The process 700 begins at block 702 by generating candidate pose configurations of a robotic manipulator. Each candidate pose configuration of the set of pose configurations can include a first end of the robotic manipulator being positioned along a trajectory. The first end may, in some examples, be an end effector of the robotic manipulator. The trajectory may be used to perform a task, such as moving an object (e.g., grasped by the end effector) from an initial location to a destination location along the trajectory. The trajectory can include or be divided into waypoints. For each waypoint, a plurality of pose configurations can be sampled from a workspace of potential pose configurations. The sampled pose configurations at each waypoint can be combined to generate the candidate pose configurations. Each candidate pose configuration can include at least one of one or more joint positions of the robotic manipulator or one or more joint angles of the robotic manipulator that result in the first end (e.g., end effector) being positioned at a waypoint of the trajectory.

At block 704, the process 700 involves determining a velocity ellipsoid and a force ellipsoid for each of the candidate pose configurations. Velocity ellipsoids and force ellipsoids can be manipulability ellipsoids that represent the manipulability of the robotic manipulator in graphical form. For example, the ellipsoids can represent the ability of the robotic manipulator to alter the position of the end effector based on the current pose configuration of the joints and links. A higher manipulability measure can signify a broader range of potential movements in that specific pose configuration. When the robotic manipulator is in a singular configuration, the manipulability measure can diminish to zero. Tasks requiring relatively higher amounts of generated force may benefit from pose configurations with relatively high-value force ellipsoid major axes, while tasks requiring relatively higher amounts of generated velocity may benefit from pose configurations with relatively high-value velocity ellipsoid major axes.

At block 706, the process 700 involves generating a sequence of pose configurations for the robotic manipulator to perform a task along the trajectory by minimizing a cost function subject to a constraint. The cost function can be minimized based at least in part on the candidate pose configurations, a first weight for the velocity ellipsoid, and a second weight for the force ellipsoid. The constraints can include at least one of a maximum joint range of motion, a maximum velocity value, or a maximum torque value for the robotic arm performing the sequence of pose configurations. In some examples, the cost function can be minimized based at least in part on a first radius and a second radius. The first radius can be determined for the velocity ellipsoid along a velocity direction of interest for the task. The second radius can be determined for the force ellipsoid along a force direction of interest for the task.

The first weight and the second weight can determine how strongly the resulting sequence of pose configurations is biased towards "fast" pose configurations or "strong" pose configurations, respectively. For example, a first sequence of pose configurations can be generated based on a first velocity weight for the velocity ellipsoid that is higher than a first force weight for the force ellipsoid. A second sequence of pose configurations can be generated based on a second velocity weight for the velocity ellipsoid that is lower than a second force weight for the force ellipsoid. The robotic manipulator can execute the first sequence of pose configurations at a first linear velocity that is higher than a second linear velocity of the robotic manipulator executing the second sequence of pose configurations. Further, the robotic manipulator can execute the second sequence of pose configurations with a second joint torque that is lower than a first joint torque of the robotic manipulator executing the first sequence of pose configurations. In some examples, the weights may vary along the trajectory. For example, a first value of the first weight or the second weight for a first waypoint of the trajectory may differ from a second value of the first weight or second weight for a second waypoint of the trajectory.

FIG. 8 illustrates an example flow diagram of another process 800 for generating a sequence of pose configurations for a robotic manipulator based on velocity ellipsoids and force ellipsoids, according to at least one embodiment. In some examples, the controller 106 of FIG. 1 or the computer system 1002 of FIG. 10 may perform some or all parts of the process 800.

The process 800 can begin at block 802 by generating a workspace of potential pose configurations. The potential pose configurations can include any pose configurations (e.g., joint poses and positions) of a robotic manipulator near or at a trajectory that can be used to perform a task. At block 804, the process 800 can involve, for each waypoint of the trajectory, sampling a predefined number (e.g., k=50) of nearest neighbor pose configurations in the workspace that are centered on the waypoint. Doing so for each waypoint of the trajectory can generate the candidate pose configurations used to iteratively minimize a cost function.

At block 806, the process 800 can involve determining a first radius of a velocity ellipsoid along a velocity direction of interest and a second radius of a force ellipsoid along a force direction of interest for each of the candidate pose configurations. The first radius can indicate a direction of motion that would result in a relatively high generation of velocity for the robotic manipulator. The second radius can indicate a direction of motion that would result in a relatively high generation of force by the robotic manipulator.

At block 808, the process 800 can involve, at each waypoint of the trajectory, identifying a nearest neighbor pose configuration (e.g., of the k=50 sampled pose configurations for that corresponding waypoint) that has a velocity ellipsoid with a highest first major axis value. Similarly, at each waypoint of the trajectory, a nearest neighbor pose configuration can be identified that has a force ellipsoid with a highest second major axis value.

At block 810, the process 800 can involve, at each waypoint of the trajectory, normalizing the first radius of the velocity ellipsoid with the highest first major axis value and normalizing the second radius of the force ellipsoid with the highest second major axis value. For example, normalizing can include dividing the first radius by the highest first major axis value and dividing the second radius by the highest second major axis value. The normalized radii can be included in terms (e.g., a velocity term and a force term) of a cost function used to generate a sequence of pose configurations. The normalized radii can be unitless.

At block 812, the process 800 can involve iterating over the candidate configurations to minimize the cost function subject to constraints to generate a sequence of pose configurations. The cost function can include the velocity term and the force term, which can include the normalized first radius and normalized second radius, respectively. Each of the velocity term and the force term can have an associated weight that can determine how strongly the resulting sequence of pose configurations is weighted towards "fast" pose configurations (e.g., based on the velocity term) or "strong" pose configurations (e.g., based on the force term).

FIG. 9 illustrates an example flow diagram of a process 900 for updating a sequence of pose configurations based on sensor data, according to at least one embodiment. In some examples, the controller 106 of FIG. 1 or the computer system 1002 of FIG. 10 may perform some or all parts of the process 900.

The process 900 can start at block 902 by causing the robotic manipulator to perform a task (e.g., manipulating a position of an object along a trajectory) by executing the trajectory and a sequence of pose configurations. For example, a motion plan for executing the task can be generated according to the sequence of pose configurations. The robotic manipulator can be caused to perform the sequence of pose configurations.

At block 904, the process 900 can involve receiving sensor data for the robotic manipulator that is detected while the robotic manipulator is performing the task. For example, the sensor data can include torque sensor data and velocity sensor data for joints, links, end effector, payload, or any other component of the robotic manipulator or robot station.

At block 906, the process 900 can involve adjusting the sequence of pose configurations based on the sensor data. For example, the cost function may include a velocity term based on radii of velocity ellipsoids along a velocity direction of interest for potential pose configurations of the robotic manipulator. The cost function may also include a force term based on radii of force ellipsoids along a force direction of interest for potential pose configurations of the robotic manipulator. The velocity direction of interest (e.g., a velocity vector) or the force direction of interest (e.g., a force vector) may be adjusted to include additional vectors based on the sensor data. Updating the velocity directions of interest may adjust the ellipsoid radii, thus adjusting the force terms and velocity terms in the cost function. The cost function may once again be minimized subject to constraints by iterating over the candidate configurations to generate an adjusted sequence of pose configurations.

At block 910, the process 900 involves causing the robotic manipulator to perform a remainder of the task by executing the adjusted sequence of pose configurations. The adjusted sequence of pose configurations may perform the task more efficiently (e.g., may lift heavier weights or perform the task faster) than the original sequence of pose configurations.

Figure 10:
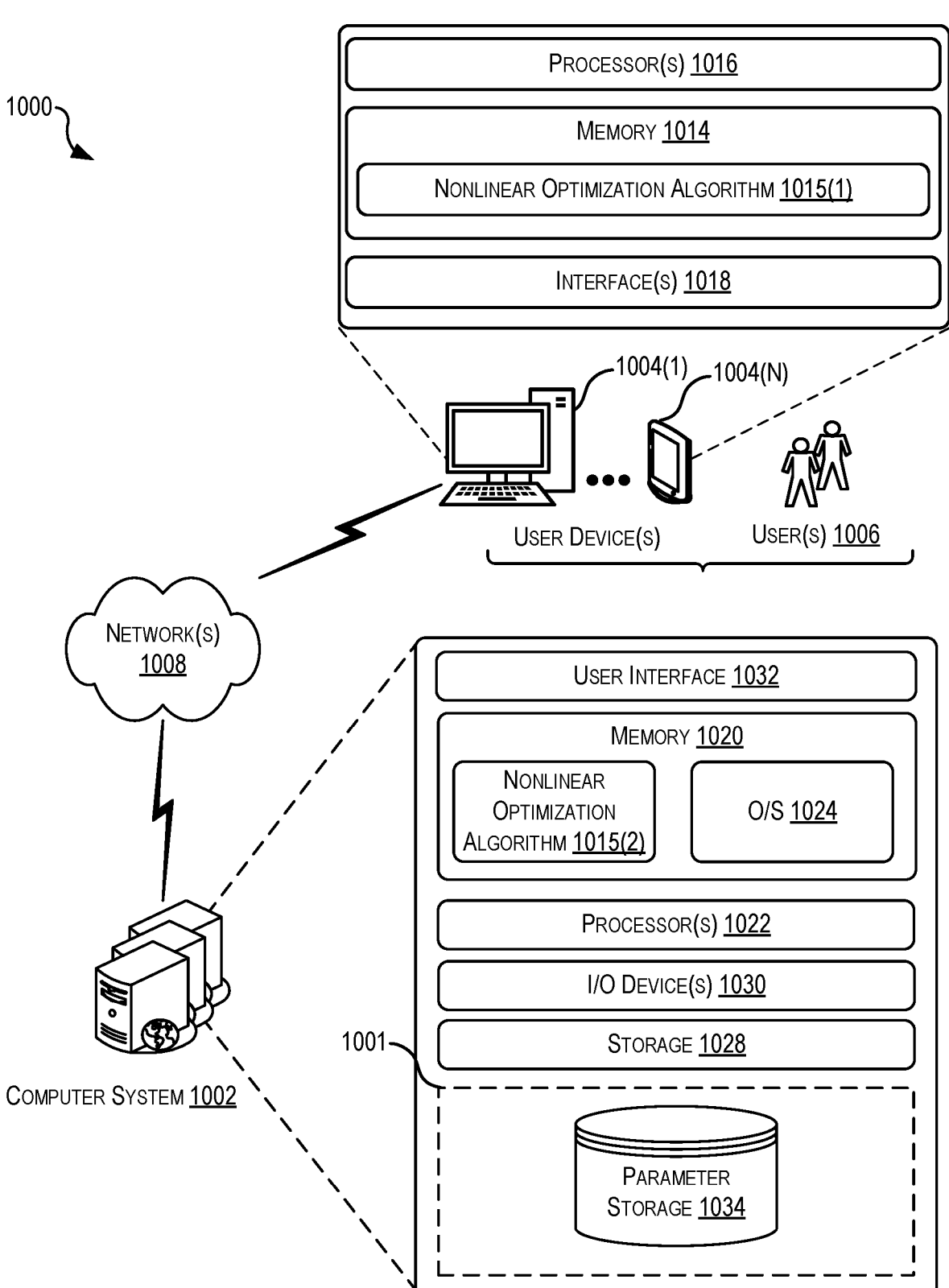
FIG. 10 illustrates an environment in which various embodiments can be implemented.

FIG. 10 illustrates aspects of an example environment 1000 for implementing aspects in accordance with various embodiments. The environment 1000 may include a computer system 1002 (e.g., the controller 106 described herein) in communication with one or more user devices 1004(1)-1004(N) via one or more networks 1008 (hereinafter, "the network 1008").

The user device 1004 may be operable by one or more users 1006 to interact with the computer system 1002. The user device 1004 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), an onboard computer, a tablet computer, etc. For example, the user device 1004(1) is illustrated as a desktop computer, while the user device 1004(N) is illustrated as an example of a handheld mobile device.

The user device 1004 may include a memory 1014 and processor(s) 1016. In the memory 1014 may be stored program instructions that are loadable and executable on the processor(s) 1016, as well as data generated during the execution of these programs. Depending on the configuration and type of user device 1004, the memory 1014 may be volatile (such as random access memory ("RAM")) and/or non-volatile (such as read-only memory (ROM), flash memory, etc.).

In some examples, the memory 1014 may include a version of nonlinear optimization algorithm 1015 (e.g., nonlinear optimization algorithm 1015(1)). The nonlinear optimization algorithm 1015(1) may allow the user 1006 to interact with the computer system 1002 via the network 1008. The user device 1004 may also include one or more interfaces 1018 to enable communication with other devices, systems, and the like. The nonlinear optimization algorithm 1015(1), whether embodied in the user device 1004 or the computer system 1002, may be configured to perform the techniques described herein. For example, the nonlinear optimization algorithm 1015(1) can be configured to generate a task-specific sequence of pose configurations for a robotic manipulator by minimizing an objective function subject to constraints. In an example, the nonlinear optimization algorithm 1015(1) can include any other suitable devices, engines, modules, models, and the like.

Turning now to the details of the computer system 1002, the computer system 1002 may include one or more computer system computers, perhaps arranged in a cluster of servers or as a server farm, and may host web service applications. The function of the computer system 1002 may be implemented a cloud-based environment such that individual components of the computer system 1002 are virtual resources in a distributed environment.

The computer system 1002 may include at least one memory 1020 and one or more processing units (or processor(s)) 1022. The processor 1022 may be implemented as appropriate in hardware, computer-executable instructions, software, firmware, or combinations thereof. Computer-executable instruction, software, or firmware implementations of the processor 1022 may include computer-executable or machine-executable instructions written in any suitable programming language to perform the various functions described. The memory 1020 may include more than one memory and may be distributed throughout the computer system 1002. The memory 1020 may store program instructions that are loadable and executable on the processor(s) 1022, as well as data generated during the execution of these programs. Depending on the configuration and type of memory including the computer system 1002, the memory 1020 may be volatile (such as RAM and/or non-volatile (such as read-only memory ("ROM"), flash memory, or other memory)). The memory 1020 may include an operating system 1024 and one or more application programs, modules, or services for implementing the features disclosed herein including at least a version of the nonlinear optimization algorithm 1015 (e.g., 1015(2)). For example, the nonlinear optimization algorithm 1015(2) may perform the functionality described herein to generate sequences of pose configurations for robotic manipulators by minimizing a cost function subject to constraints.

The computer system 1002 may also include additional storage 1028, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 1028, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 1002 and/or part of the controller 106.

The computer system 1002 may also include input/output (I/O) device(s) and/or ports 1030, such as for enabling connection with a keyboard, a mouse, a pen, a voice input device, a touch input device, a display, speakers, a printer, or other I/O device.

In some examples, the computer system 1002 may also include one or more user interface(s) 1032. The user interface 1032 may be utilized by an operator, curator, or other authorized user to access portions of the computer system 1002. In some examples, the user interface 1032 may include a graphical user interface, voice interfaces, web-based applications, programmatic interfaces such as APIs, or other user interface configurations.

The computer system 1002 may also include a data store 1001. In some examples, the data store 1001 may include one or more databases, data structures, or the like for storing and/or retaining information associated with the computer system 1002. The nonlinear optimization algorithm 1015 is communicatively coupled (e.g., via a wired connection or a wireless connection) to the data store 1001. The data store 1001 includes a design parameter storage 1034. In an example, the data store 1001 can include any other suitable data, databases, libraries, and the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system, comprising:
a processing device; and
a non-transitory memory configured to store instructions that are executable by the processing device for causing the processing device to at least:
generate a trajectory of an end effector of a robotic arm based on a set of waypoints, wherein the trajectory is usable by the robotic arm to perform a task involving moving an object grasped by the end effector from an initial location to a destination location;
generate candidate pose configurations of the robotic arm by determining, for each waypoint of the trajectory of the end effector, a plurality of pose configurations that include the end effector being positioned at the waypoint, wherein a pose configuration of the candidate pose configurations comprises one or more joint positions and one or more joint angles of the robotic arm;
determine a velocity term of a cost function based on a velocity ellipsoid for each of the candidate pose configurations;
determine a force term of the cost function based on a force ellipsoid for each of the candidate pose configurations;

determine a first weight for the velocity term and a second weight for the force term;
generate a sequence of pose configurations for the robotic arm to perform the task along the trajectory by minimizing a cost function subject to one more constraints based on (i) the candidate pose configurations, (ii) the first weight and the velocity term, and (iii) the second weight and the force term;
generate a motion plan for the robotic arm based at least in part on the sequence of pose configurations; and
cause the robotic arm to implement the motion plan to execute the task.

2. The computer system of claim 1, wherein the non-transitory memory is further configured to store instructions that are executable by the processing device for causing the processing device to determine the plurality of pose configurations for each waypoint of the trajectory by:
sampling a predefined number of nearest neighbor pose configurations centered on the waypoint.

3. The computer system of claim 2, wherein the non-transitory memory is further configured to store instructions that are executable by the processing device for causing the processing device to, for each waypoint of the trajectory:
identify a nearest neighbor pose configuration of the sampled nearest neighbor pose configurations that has a velocity ellipsoid with a highest first major axis value;
identify another nearest neighbor pose configuration that has a force ellipsoid with a highest second major axis value;
normalize the velocity term of the cost function based at least in part on the highest first major axis value; and
normalize the force term of the cost function based at least in part on the highest second major axis value.

4. The computer system of claim 1, wherein the one or more constraints comprise at least one of a maximum joint range of motion, a maximum velocity value, or a maximum torque value for the robotic arm performing the sequence of pose configurations.

5. A computer-implemented method, comprising:
generating candidate pose configurations of a robotic manipulator, each of the candidate pose configurations including a first end of the robotic manipulator being positioned along a trajectory;
determining a velocity ellipsoid and a force ellipsoid for each of the candidate pose configurations;
generating a sequence of pose configurations for the robotic manipulator to perform a task along the trajectory by minimizing a cost function subject to one or more constraints based at least in part on (i) the candidate pose configurations, (ii) a first weight for the velocity ellipsoid, and (iii) a second weight for the force ellipsoid; and
causing the robotic manipulator to perform the task by executing the trajectory and the sequence of pose configurations.

6. The computer-implemented method of claim 5, further comprising, for each of the candidate pose configurations:
determining a first radius of the velocity ellipsoid along a velocity direction of interest for the task; and
determining a second radius of the force ellipsoid along a force direction of interest for the task,
wherein the cost function is minimized at least in part on the first radius and the second radius.

7. The computer-implemented method of claim 5, wherein the trajectory is usable by the robotic manipulator to move an object grasped at the first end from an initial location to a destination location.

8. The computer-implemented method of claim 5, wherein each of the candidate pose configurations comprises at least one of one or more joint positions of the robotic manipulator or one or more joint angles of the robotic manipulator resulting in the first end being positioned at a waypoint of the trajectory.

9. The computer-implemented method of claim 5, wherein the one or more constraints comprises at least one of a maximum joint range of motion, a maximum velocity value, or a maximum torque value for the robotic manipulator performing the sequence of pose configurations.

10. The computer-implemented method of claim 5, further comprising
   generating the trajectory for the first end of the robotic manipulator based at least in part on a set of waypoints,
   wherein generating the candidate pose configurations further comprises determining, for each waypoint of the trajectory, a plurality of pose configurations that include the first end of the robotic manipulator being positioned at the waypoint.

11. The computer-implemented method of claim 10, wherein determining, for each waypoint of the trajectory, the plurality of pose configurations further comprises:
   sampling a predefined number of nearest neighbor pose configurations centered on the waypoint.

12. The computer-implemented method of claim 11, further comprising, for each waypoint of the trajectory:
   identifying the nearest neighbor pose configuration having a velocity ellipsoid with a highest first major axis value;
   identifying the nearest neighbor pose configuration having a force ellipsoid with a highest second major axis value;
   normalizing a first radius for the velocity ellipsoid in the cost function based at least in part on the highest first major axis value; and
   normalizing a second radius for the force ellipsoid in the cost function based at least in part on the highest second major axis value.

13. The computer-implemented method of claim 5, wherein a first value of the first weight or the second weight in the cost function for a first waypoint of the trajectory is different than a second value of the first weight or the second weight in the cost function for a second waypoint of the trajectory.

14. The computer-implemented method of claim 5, further comprising:
   generating a first sequence of pose configurations based on a first velocity weight for the velocity ellipsoid that is higher than a first force weight for the force ellipsoid; and
   generating a second sequence of pose configurations based on a second velocity weight for the velocity ellipsoid that is lower than a second force weight for the force ellipsoid,
   wherein the robotic manipulator is configured to execute the first sequence of pose configurations at a first linear velocity that is higher than a second linear velocity of the robotic manipulator executing the second sequence of pose configurations.

15. The computer-implemented method of claim 14, wherein the robotic manipulator is configured to execute the second sequence of pose configurations with a second joint torque that is lower than a first joint torque of the robotic manipulator executing the first sequence of pose configurations.

16. One or more non-transitory computer-readable media comprising computer-executable instructions that, when executed by one or more processing devices of a computer system, cause the computer system to perform operations comprising:
   generating candidate pose configurations of a robotic manipulator, each of the candidate pose configurations including a first end of the robotic manipulator being positioned along a trajectory;
   determining a velocity ellipsoid and a force ellipsoid for each of the candidate pose configurations;
   generating a sequence of pose configurations for the robotic manipulator to perform a task along the trajectory by minimizing a cost function subject to one or more constraints based at least in part on (i) the candidate pose configurations, (ii) a first weight for the velocity ellipsoid, and (iii) a second weight for the force ellipsoid; and
   causing the robotic manipulator to perform the task by executing the trajectory and the sequence of pose configurations.

17. The one or more non-transitory computer-readable media of claim 16, wherein the operations further comprise:
   receiving sensor data for the robotic manipulator detected while the robotic manipulator is performing the task;
   adjusting the sequence of pose configurations based at least in part on the sensor data; and
   causing the robotic manipulator to perform a remainder of the task by executing the adjusted sequence of pose configurations.

18. The one or more non-transitory computer-readable media of claim 16, wherein the task involves manipulating a position of an object via the first end of the robotic manipulator, wherein each of the candidate pose configurations comprises at least one of one or more joint positions of the robotic manipulator or one or more joint angles of the robotic manipulator resulting in the first end being positioned at a waypoint of the trajectory.

19. The one or more non-transitory computer-readable media of claim 18, wherein the operations further comprise:
   receiving sensor data associated with the robotic manipulator manipulating the position of the object, the sensor data comprising at least one of torque data, velocity data, or position data for the robotic manipulator or the object; and
   determining the first weight or the second weight based at least in part on the sensor data.

20. The one or more non-transitory computer-readable media of claim 16, wherein the operations further comprise, for each of the candidate pose configurations:
   determining a first radius of the velocity ellipsoid along a velocity direction of interest for the task; and
   determining a second radius of the force ellipsoid along a force direction of interest for the task,
   wherein the cost function is minimized at least in part by using the first radius and the second radius.

* * * * *